US008547045B2

(12) United States Patent
Wu et al.

(10) Patent No.: US 8,547,045 B2
(45) Date of Patent: Oct. 1, 2013

(54) METHOD AND SYSTEM CONTROLLING AN ELECTRICAL MOTOR WITH TEMPERATURE COMPENSATION

(75) Inventors: Long Wu, Fargo, ND (US); Robert Shaw, Moorhead, MN (US)

(73) Assignee: Deere & Company, Moline, IL (US)

( * ) Notice: Subject to any disclaimer, the term of this patent is extended or adjusted under 35 U.S.C. 154(b) by 219 days.

(21) Appl. No.: 13/169,407

(22) Filed: Jun. 27, 2011

(65) Prior Publication Data

US 2012/0212169 A1    Aug. 23, 2012

Related U.S. Application Data

(60) Provisional application No. 61/445,650, filed on Feb. 23, 2011.

(51) Int. Cl.
*H02P 7/00* (2006.01)
(52) U.S. Cl.
USPC .................. 318/432; 318/400.02; 318/400.23
(58) Field of Classification Search
USPC ............... 318/432, 400.02, 400.23, 805, 803, 318/807
See application file for complete search history.

(56) References Cited

U.S. PATENT DOCUMENTS

| | | | |
|---|---|---|---|
| 4,023,083 A | 5/1977 | Plunkett | |
| 4,814,677 A | 3/1989 | Plunkett | |
| 5,428,283 A | 6/1995 | Kalman et al. | |
| 5,486,748 A | 1/1996 | Konrad et al. | |
| 5,914,582 A | 6/1999 | Takamoto et al. | |
| 6,042,265 A | 3/2000 | Kliman et al. | |
| 6,275,000 B1 | 8/2001 | Nishimura | |
| 7,045,988 B2 | 5/2006 | Ha et al. | |
| 7,157,878 B2 | 1/2007 | Collier-Hallman | |
| 7,733,044 B2 | 6/2010 | Nakamura et al. | |
| 2006/0247829 A1 | 11/2006 | Sato | |
| 2009/0189561 A1 | 7/2009 | Patel et al. | |
| 2009/0237014 A1* | 9/2009 | Yamada | 318/400.02 |

OTHER PUBLICATIONS

Elbuluk, Malik E. et al. Speed Sensorless Induction Motor Drives for Electrical Actuators: Schemes, Trends and Tradeoffs. NASA Technical Memorandum 107466. Retrieved from the Internet<URL:http://www.esat.kuleuven.be/electa/publications/fulltexts/pub_479.pdf>, Aug. 1997.
Van Haute, S. et al. Design and Control of a Permanent Magnet Synchronous Motor Drive for a Hybrid Electric Vehicle. Retrieved from the Internet:<URL:http://www.esat.kuleuven.be/electa/publications/fulltexts/pub_444.pdf>, 1997.
US 7,595,604, 09/2009, Tomigashi (withdrawn)

* cited by examiner

*Primary Examiner* — Karen Masih

(57) ABSTRACT

A temperature estimation module estimates a change in temperature of the magnets associated with the rotor of the motor based on an operational magnetic flux strength that is compared to a reference magnetic flux strength determined at a known ambient temperature and for a predetermined operating range of the motor The temperature estimation module or the system establishes a relationship between the estimated change in the temperature and a magnetic torque component of a target output torque of the motor consistent with the predetermined operating range. The current adjustment module or the system adjusts a command (e.g., quadrature-axis current command) for the motor to compensate for shaft torque variation associated with the estimated change in the temperature in conformance with the established relationship.

20 Claims, 6 Drawing Sheets

US 8,547,045 B2

METHOD AND SYSTEM CONTROLLING AN ELECTRICAL MOTOR WITH TEMPERATURE COMPENSATION

This document claims priority based on U.S. provisional application Ser. No. 61/445,650, filed on 23 Feb. 2011 and entitled METHOD AND SYSTEM CONTROLLING AN ELECTRICAL MOTOR WITH TEMPERATURE COMPENSATION, under 35 U.S.C. 119(e).

FIELD OF THE INVENTION

This invention relates to a method and system for controlling an electrical motor with temperature compensation.

BACKGROUND OF THE INVENTION

An electric motor may feature a rotor with permanent magnets and a stator, such as an interior permanent magnet (IPM) motor or IPM synchronous motor. An interior permanent magnet (IPM) motor or IPM synchronous machine may have varying magnetic field strength because of a temperature change in the magnets associated with the rotor. In turn, if the magnetic field strength decreases, the output torque and operating efficiency of the motor tends to decrease. Certain motors have no direct temperature sensors that measure the temperature of the magnets on the rotor, as opposed to the stator housing or the stator windings. Further, the rotor magnet temperature may have a poorly defined, erratic or inconsistent relationship with the stator winding temperature or coolant temperature at different speed regions of the motor. Thus, there is a need for an improved method and system for controlling an electrical motor with temperature compensation.

SUMMARY OF THE INVENTION

In accordance with one embodiment, the method and system for controlling an electrical motor comprises a rotor with associated rotor magnets and a stator. A temperature estimation module estimates a change in temperature of the magnets associated with the rotor of the motor based on an operational magnetic flux strength that is compared to a reference magnetic flux strength determined at a known ambient temperature and for a predetermined operating range of the motor. The temperature estimation module or the system establishes a relationship between the estimated change in the temperature and a magnetic torque component of a target output torque of the motor consistent with the predetermined operating range. The current adjustment module or the data processing system adjusts a command (e.g., quadrature-axis current command or the quadrant axis current) for the motor to compensate for shaft torque variation associated with the estimated change in the temperature in conformance with the established relationship.

DESCRIPTION OF THE PREFERRED EMBODIMENT

Figure 1:
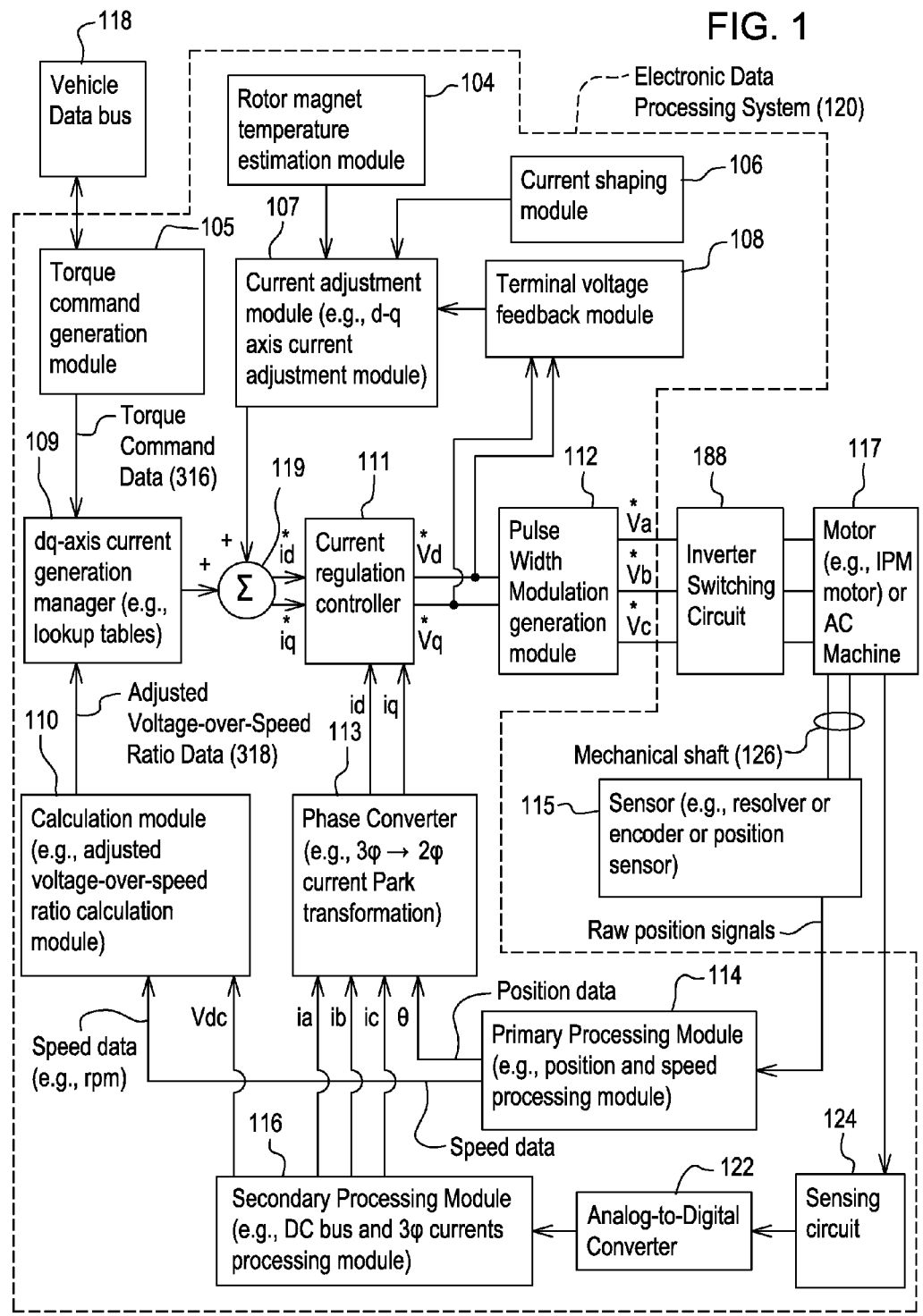
FIG. 1 is a block diagram of one embodiment of a system for controlling an electrical motor with temperature compensation.

In accordance with one embodiment, FIG. 1 discloses system for controlling a motor 117 (e.g., an interior permanent magnet (IPM) motor) or another alternating current machine. In one embodiment, the system, aside from the motor 117, may be referred to as an inverter or a motor controller.

The system comprises electronic modules, software modules, or both. In one embodiment, the motor controller comprises an electronic data processing system 120 to support storing, processing or execution of software instructions of one or more software modules. The electronic data processing system 120 is indicated by the dashed lines in FIG. 1 and is shown in greater detail in FIG. 2.

The data processing system 120 is coupled to an inverter circuit 188. The inverter circuit 188 comprises a semiconductor drive circuit that drives or controls switching semiconductors (e.g., insulated gate bipolar transistors (IGBT) or other power transistors) to output control signals for the motor 117. In turn, the inverter circuit 188 is coupled to the motor 117. The motor 117 is associated with a sensor 115 (e.g., a position sensor, a resolver or encoder position sensor) that is associated with the motor shaft 126 or the rotor. The sensor 115 and the motor 117 are coupled to the data processing system 120 to provide feedback data (e.g., current feedback data, such as $i_a$, $i_b$, $i_c$), raw position signals, among other possible feedback data or signals, for example. Other possible feedback data includes, but is not limited to, winding temperature readings, semiconductor temperature readings of the inverter circuit 188, three phase voltage data, or other thermal or performance information for the motor 117.

In one embodiment, the torque command generation module 105 is coupled to a d-q axis current generation manager 109 (e.g., d-q axis current generation look-up tables). D-q axis current refers to the direct axis current and the quadrature axis current as applicable in the context of vector-controlled alternating current machines, such as the motor 117. The output of the d-q axis current generation manager 109 and the output of a current adjustment module 107 (e.g., d-q axis current adjustment module 107) are fed to a summer 119. In turn, one or more outputs (e.g., direct axis current data ($i_d$*) and quadrature axis current data ($i_q$*)) of the summer 119 are provided or coupled to a current regulation controller 111.

The current regulation controller 111 is capable of communicating with the pulse-width modulation (PWM) generation module 112 (e.g., space vector PWM generation module). The current regulation controller 111 receives respective d-q axis current commands (e.g., $i_d$* and $i_q$*) and actual d-q axis currents (e.g., $i_d$ and $i_q$) and outputs corresponding d-q axis voltage commands (e.g., $v_d$* and $v_q$* commands) for input to the PWM generation module 112.

In one embodiment, the PWM generation module 112 converts the direct axis voltage and quadrature axis voltage data from two phase data representations into three phase representations (e.g., three phase voltage representations, such as $v_a$*, $v_b$* and $v_c$*) for control of the motor 117, for example. Outputs of the PWM generation module 112 are coupled to the inverter 188.

The inverter circuit 188 comprises power electronics, such as switching semiconductors to generate, modify and control pulse-width modulated signals or other alternating current signals (e.g., pulse, square wave, sinusoidal, or other waveforms) applied to the motor 117. The PWM generation module 112 provides inputs to a driver stage within the inverter circuit 188. An output stage of the inverter circuit 188 provides a pulse-width modulated voltage waveform, or other voltage signal for control of the motor. In one embodiment, the inverter 188 is powered by a direct current (DC) voltage bus.

The motor 117 is associated with a sensor 115 (e.g., a resolver, encoder, speed sensor, or another position sensor or speed sensors) that estimates at least one of an angular position of the motor shaft 126, a speed or velocity of the motor shaft 126, and a direction of rotation of the motor shaft 126. The sensor 115 may be mounted on or integral with the motor shaft 126. The output of the sensor 115 is capable of communication with the primary processing module 114 (e.g., position and speed processing module). In one embodiment, the sensor 115 may be coupled to an analog-to-digital converter (not shown) that converts analog position data or velocity data to digital position or velocity data, respectively. In other embodiments, the sensor 115 (e.g., digital position encoder) may provide a digital data output of position data or velocity data for the motor shaft 126 or rotor.

A first output (e.g., position data and speed data for the motor 117) of the primary processing module 114 is communicated to the phase converter 113 (e.g., three-phase to two-phase current Park transformation module) that converts respective three-phase digital representations of measured current into corresponding two-phase digital representations of measured current. A second output (e.g., speed data) of the primary processing module 114 is communicated to the calculation module 110 (e.g., adjusted voltage over speed ratio module).

An input of a sensing circuit 124 is coupled to terminals of the motor 117 for sensing at least the measured three-phase currents and a voltage level of the direct current (DC) bus (e.g., high voltage DC bus which may provide DC power to the inverter circuit 188). An output of the sensing circuit 124 is coupled to an analog-to-digital converter 122 for digitizing the output of the sensing circuit 124. In turn, the digital output of the analog-to-digital converter 122 is coupled to the secondary processing module 116 (e.g., Direct current (DC) bus and three phase current processing module). For example, the sensing circuit 124 is associated with the motor 117 for measuring three phase currents (e.g., current applied to the windings of the motor 117, back EMF induced into the windings, or both).

Certain outputs of primary processing module 114 and the secondary processing module 116 feed the phase converter 113. For example, the phase converter 113 may apply a Park transformation or other conversion equations (e.g., certain conversion equations that are suitable are known to those of ordinary skill in the art) to convert the measured three-phase representations of current into two-phase representations of current based on the digital three-phase current data from the secondary processing module 116 and position data from the sensor 115. The output of the phase converter 113 module is coupled to the current regulation controller 111.

Other outputs of the primary processing module 114 and the secondary processing module 116 may be coupled to inputs of the calculation module 110 (e.g., adjusted voltage over-speed ratio calculation module). For example, the primary processing module 114 may provide speed data (e.g., motor shaft 126 revolutions per minute), whereas the secondary processing module 116 may provide a measured level of direct current voltage (e.g., on the direct current (DC) bus of a vehicle). The direct current voltage level on the DC bus that supplies the inverter circuit 188 with electrical energy may fluctuate or vary because of various factors, including, but not limited to, ambient temperature, battery condition, battery charge state, battery resistance or reactance, fuel cell state (if applicable), motor load conditions, respective motor torque and corresponding operational speed, and vehicle electrical loads (e.g., electrically driven air-conditioning compressor). The calculation module 110 is connected as an intermediary between the secondary processing module 116 and the dq-axis current generation manager 109. The output of the calculation module 110 can adjust or impact current commands generated by the d-q axis current generation manager 109 to compensate for fluctuation or variation in direct current bus voltage, among other things.

The rotor magnet temperature estimation module 104, the current shaping module 106, and the terminal voltage feedback module 108 are coupled to or are capable of communicating with the dq-axis current adjustment module 107. In turn, the d-q axis current module 107 may communicate with the dq-axis current generation manager or the summer 119.

The rotor magnet temperature module 104 estimates or determines the temperature of the rotor permanent magnet or magnets. In one embodiment, the rotor magnet temperature estimation module 104 may estimate the temperature of the rotor magnets from internal control variables calculation, one or more sensors located on the stator, in thermal communication with the stator, or secured to the housing of the motor 117. For example, the rotor magnet temperature module can estimate or facilitate the determination of the temperature of the rotor or a current adjustment based on the estimated temperature by observing a change in magnetic field strength or available torque of the motor 117 at an ambient or a reference temperature versus an actual elevated operating temperature.

In one alternate embodiment, the rotor magnet temperature estimation module 104 may be replaced by or may estimate the temperature of the rotor magnets from one or more sensors located on the stator, in thermal communication with the stator, or secured to the housing of the motor 117.

In another alternative embodiment, the rotor magnet temperature estimation module 104 may be replaced with a temperature detector (e.g., a thermistor or infrared thermal sensor coupled to wireless transmitter) mounted on the rotor or the magnet, where the detector provides a signal (e.g., wireless signal) indicative of the temperature of the magnet or magnets.

In one embodiment, the method or system may operate in the following manner. The torque command generation module 105 receives an input control data message, such as a speed control data message, a voltage control data message, or a torque control data message, over a vehicle data bus 118. The torque command generation module 105 converts the received input control message into torque control command data 316.

The d-q axis current generation manager 109 selects or determines the direct axis current command data and the quadrature axis current command data associated with respective torque control command data and respective detected motor shaft 126 speed data. For example, the d-q axis current generation manager 109 selects or determines the direct axis current command, the quadrature axis current command by accessing one or more of the following: (1) a look-up table, database or other data structure that relates respective torque commands to corresponding direct and quadrature axes currents, (2) a set of quadratic equations or linear equations that relate respective torque commands to corresponding direct and quadrature axes currents, or (3) a set of rules (e.g., if-then rules) that relates respective torque commands to corresponding direct and quadrature axes currents. The sensor 115 on the motor 117 facilitates provision of the detected speed data for the motor shaft 126, where the primary processing module 114 may convert position data provided by the sensor 115 into speed data.

The current adjustment module 107 (e.g., d-q axis current adjustment module) provides current adjustment data to adjust the direct axis current command data and the quadrature axis current command data based on input data from the rotor magnet temperature estimation module 104 and the current shaping module 106 and terminal voltage feedback module 108.

The current shaping module 106 may determine a correction or preliminary adjustment of the quadrature axis (q-axis) current command and the direct axis (d-axis) current command based on one or more of the following factors: torque load on the motor 117 and speed of the motor 117, for example. The rotor magnet temperature estimation module 104 may generate a secondary adjustment of the q-axis current command and the d-axis current command based on an estimated change in rotor temperature or an estimated change in magnetic field strength of the rotor magnets with respect to a characterized rotor temperature or magnetic field strength at a known ambient temperature under known operational conditions, for example. The terminal voltage feedback module 108 may provide a third adjustment to the d-axis current command and q-axis current command based on a controller voltage command versus a voltage limit. The current adjustment module 107 may provide an aggregate current adjustment that considers the preliminary adjustment, one of the secondary adjustment and the third adjustment.

In one embodiment, the motor 117 may comprise an interior permanent magnet (IPM) machine or a synchronous IPM machine (IPMSM). An IPMSM has many favorable advantages compared with conventional induction machines or surface mounted PM machines (SMPM) such as high efficiency, high power density, wide constant power operating region, maintenance free, for instance.

If the motor 117 comprises an IPMSM, the output torque consists of two components, magnetic torque and reluctance torque, as follows:

$$T_{shaft} = T_{mag} + T_{rel} = \frac{3}{2} pp \cdot \lambda_f \cdot i_q + \frac{3}{2} pp \cdot (L_d - L_q) \cdot i_d \cdot i_q \quad (1)$$

In Equation 1, $T_{shaft}$ is the total torque of the motor, $T_{mag}$ is the magnetic torque component, $T_{rel}$ is the reluctance torque component, pp is the number of pole pairs of the motor or machine, $\lambda_f$ is the maximum flux linkage per phase, $i_d$ is the direct axis current, $i_q$ is the quadrature axis current, $L_d$ is the direct axis inductance, and $L_q$ is the quadrature axis inductance.

In Equation 1, the maximum flux linkage per phase ($\lambda_f$) can be determined by magnet strength and magnetic saturation level. $L_d$ and $L_q$ are machine d-q axis inductances, which vary depending on magnetic saturation level. For the purpose of simplicity, the following assumptions apply to Equation 1:

1. $\lambda_f$ is directly proportional to magnet strength, as is the magnetic torque component $T_{mag}$;
2. $L_d$ and $L_q$ are functions of $i_d$ and $i_q$ only, although $\lambda_f$ change has slight impact on $L_d$ and $L_q$, where $L_d$ and $L_q$ can be derived from finite element analysis based simulations; and
3. $(L_d - L_q)$ has negligible change when the d-q axis current $(i_d, i_q)$ varies slightly, and the reluctance torque component $T_{rel}$ has a negligible change with the d-q axis current varies slightly.

Without adjusting current commands $(i_d, i_q)$, magnet strength fluctuation due to magnet temperature change would cause a corresponding percentage change in the magnetic torque component $T_{mag}$. However, the net percentage change in the total output torque still depends on the weighting of each torque component, which varies with respect to operating conditions.

In steady-state operation of an IMPSM (e.g., motor 117), the output of the current regulation controller 111 provides d-q axis terminal voltages can be expressed as follows:

$$v_d = r_s \cdot i_d - \omega_e \cdot L_q \cdot i_q \quad (2)$$

$$v_q = r_s \cdot i_q \omega_e \cdot L_d \cdot i_d + \omega_e \cdot \lambda_f \quad (3)$$

In Equations 2 and 3, $v_d$ is the direct axis voltage or command, $v_q$ is the quadrature axis voltage or command, $r_s$ is the stator resistance of the motor or machine, $i_d$ is the direct axis current, $i_q$ is the quadrature axis current, $\omega_e$ is the rotational electrical speed of the rotor with respect to the stator, $\lambda_f$ is the maximum flux linkage per phase, $L_d$ is the direct axis inductance.

In Equations 2 and 3, if neglecting stator resistance ($r_s$) change with respect to stator winding temperature and assuming $L_d$ and $L_q$ are functions of d-q axis current $(i_d, i_q)$ only, the magnet temperature change that causes flux linkage ($\lambda_f$) fluctuation has no effect on d-axis terminal voltage command $v_d$. The rotational electrical speed ($\omega_e$) of the rotor may be proportional to the rotational mechanical speed of the rotor, for example. However, q-axis terminal voltage command $v_q$ will vary accordingly to accommodate $\lambda_f$ fluctuation.

The sensor 115 (e.g., shaft or rotor speed detector) may comprise one or more of the following: a direct current motor, an optical encoder, a magnetic field sensor (e.g., Hall Effect sensor), magneto-resistive sensor, and a resolver (e.g., a brushless resolver). In one configuration, the sensor 115 comprises a position sensor, where position data and associated time data are processed to determine speed or velocity data for the motor shaft 126. In another configuration, the sensor 115 comprises a speed sensor, or the combination of a speed sensor and an integrator to determine the position of the motor shaft.

In yet another configuration, the sensor 115 comprises an auxiliary, compact direct current generator that is coupled mechanically to the motor shaft 126 of the motor 117 to determine speed of the motor shaft 126, where the direct current generator produces an output voltage proportional to the rotational speed of the motor shaft 126. In still another configuration, the sensor 115 comprises an optical encoder with an optical source that transmits a signal toward a rotating object coupled to the shaft 126 and receives a reflected or diffracted signal at an optical detector, where the frequency of received signal pulses (e.g., square waves) may be proportional to a speed of the motor shaft 126. In an additional configuration, the sensor 115 comprises a resolver with a first winding and a second winding, where the first winding is fed with an alternating current, where the voltage induced in the second winding varies with the frequency of rotation of the rotor.

Figure 2:
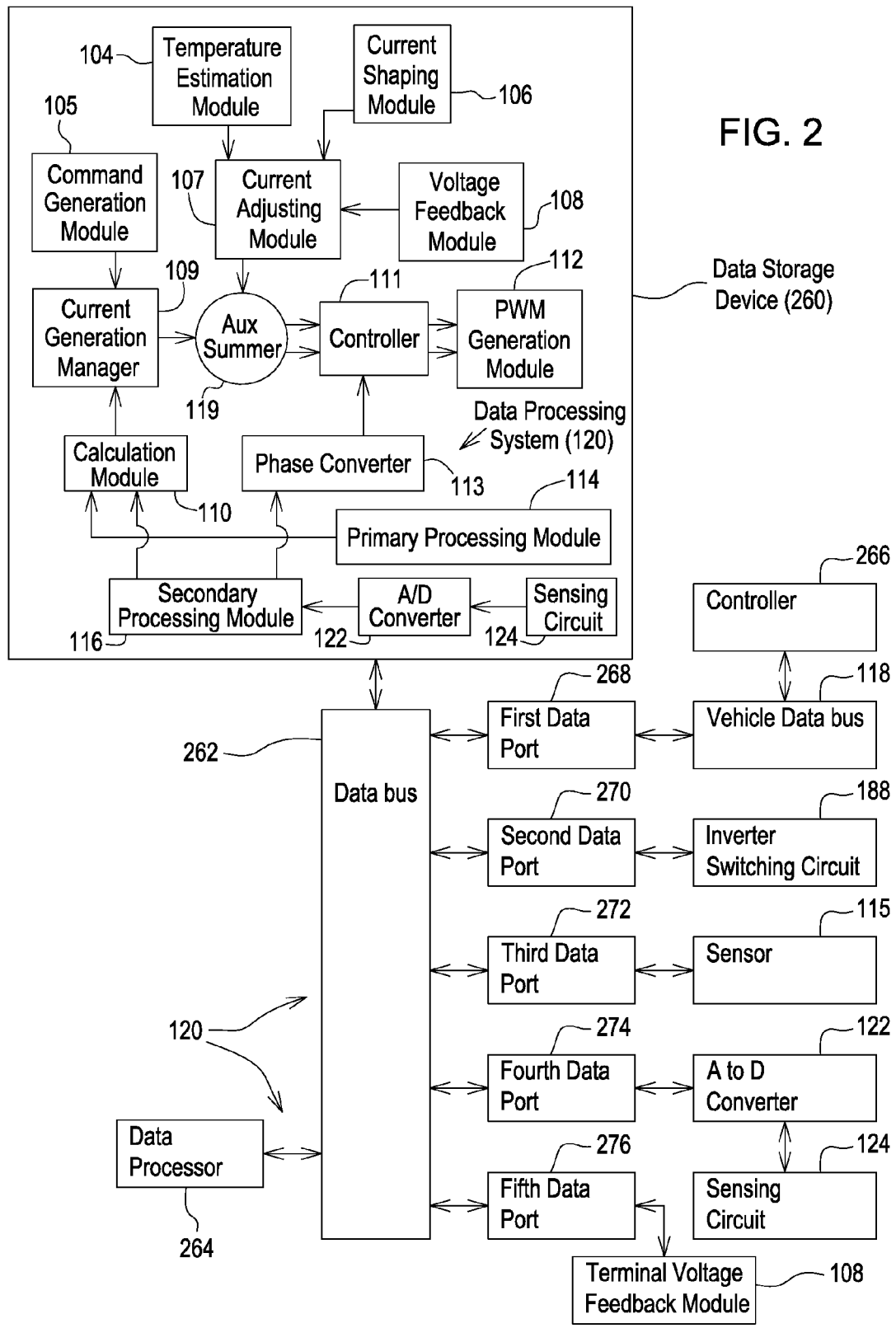
FIG. 2 is a block diagram of an electronic data processing system consistent with FIG. 1.

In FIG. 2, the electronic data processing system 120 comprises an electronic data processor 264, a data bus 262, a data storage device 260, and one or more data ports (268, 270, 272, 274 and 276). The data processor 264, the data storage device 260 and one or more data ports are coupled to the data bus 262 to support communications of data between or among the data processor 264, the data storage device 260 and one or more data ports.

In one embodiment, the data processor 264 may comprise an electronic data processor, a microprocessor, a microcontroller, a programmable logic array, a logic circuit, an arithmetic logic unit, an application specific integrated circuit, a digital signal processor, a proportional-integral-derivative (PID) controller, or another data processing device.

The data storage device 260 may comprise any magnetic, electronic, or optical device for storing data. For example, the data storage device 260 may comprise an electronic data storage device, an electronic memory, non-volatile electronic random access memory, one or more electronic data registers, data latches, a magnetic disc drive, a hard disc drive, an optical disc drive, or the like.

As shown in FIG. 2, the data ports comprise a first data port 268, a second data port 270, a third data port 272, a fourth data port 274 and a fifth data port 276, although any suitable number of data ports may be used. Each data port may comprise a transceiver and buffer memory, for example. In one embodiment, each data port may comprise any serial or parallel input/output port.

In one embodiment as illustrated in FIG. 2, the first data port 268 is coupled to the vehicle data bus 118. In turn, the vehicle data bus 118 is coupled to the controller 266. In one configuration, the second data port 270 may be coupled to the inverter circuit 188; the third data port 272 may be coupled to the sensor 115; the fourth data port 274 may be coupled to the analog-to-digital converter 122; and the fifth data port 276 may be coupled to the terminal voltage feedback module 108. The analog-to-digital converter 122 is coupled to the sensing circuit 124.

In one embodiment of the data processing system 120, the torque command generation module 105 is associated with or supported by the first data port 268 of the electronic data processing system 120. The first data port 268 may be coupled to a vehicle data bus 118, such as a controller area network (CAN) data bus. The vehicle data bus 118 may provide data bus messages with torque commands to the torque command generation module 105 via the first data port 268. The operator of a vehicle may generate the torque commands via a user interface, such as a throttle, a pedal, a controller 266, or other control device.

In certain embodiments, the sensor 115 and the primary processing module 114 may be associated with or supported by a third data port 272 of the data processing system 120.

In one embodiment, where an electrical motor (e.g., 117) comprises a rotor with associated magnets and a stator, a system for controlling the motor (e.g., 117) comprises a data processor 264 for estimating a change in temperature of the magnets associated with the rotor of the motor (e.g., 117) based on an operational magnetic flux strength that is compared to a reference magnetic flux strength determined at a known ambient temperature and for a predetermined operating range of the motor. A temperature estimation module 104 is adapted to establish a relationship between the estimated change in the temperature and a magnetic torque component of a target output torque of the motor consistent with the predetermined operating range. For example, in one configuration a temperature estimation module 104 comprises software instructions (e.g., stored in the data storage device 260 in permanent or non-transitory form) for the data processor 264 to establish a relationship between the estimated change in the temperature and a magnetic torque component of a target output torque of the motor consistent with the predetermined operating range. A current adjustment module 107 is adapted to adjust a command for the motor to compensate for shaft torque variation associated with the estimated change in the temperature in conformance with the established relationship. For example, in one configuration the current adjustment module 107 comprises software instructions (e.g., stored in the data storage device 260 in permanent or non-transitory form) for the data processor 264 to compensate for shaft torque variation associated with the estimated change in the temperature in conformance with the established relationship.

In one embodiment, the data processor 264 is arranged to derive the operational magnetic flux strength from an operational quadrature-axis voltage command and wherein the data processor 264 is arranged to derive the reference magnetic flex strength from a reference quadrature-axis voltage command. The data processor 264 is adapted to execute software instructions of the temperature estimation module 104 to establish the relationship, where the relationship comprises the magnetic torque component of the target output torque as a function of the reference magnetic flux strength, a direct-axis current command, a quadrature-axis current command, direct-axis inductance and quadrature-axis inductance.

The current adjustment module 107 or the data processor 264 may generate the command in accordance with various examples, which may be applied alternately or cumulatively. Under a first example, the command comprises a quadrature-axis current command. Under a second example, the command comprises a respective increase in a quadrature-axis current command in response to a corresponding increase in the temperature. Under a third example, the command comprises an adjustment to a quadrature-axis current command based on the estimated change in the temperature and a magnetic torque component of the target output torque.

In general, the data processor 264 may execute, determine, calculate or solve any equations or mathematical expressions set forth in this document, or variations thereof that fall within the scope of the claims, in furtherance of providing the command or other compensation for temperature change or magnetic flux strength change in the rotor magnets.

Figure 3:
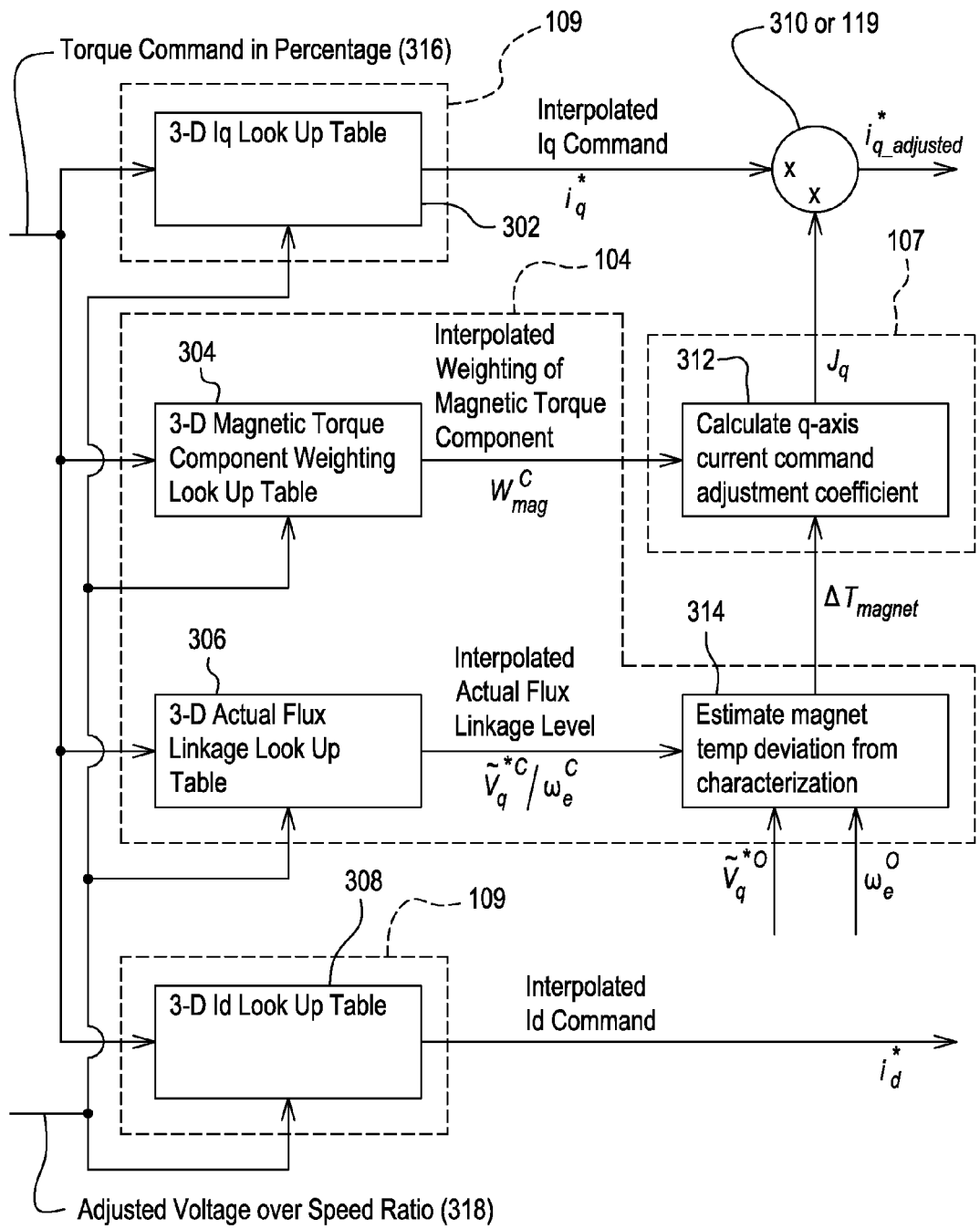
FIG. 3 is a block diagram that shows a portion of the system in greater detail than FIG. 1.

FIG. 3 illustrates one possible exemplary configuration of the rotor magnet temperature estimation module 104, the current adjustment module 107, and the d-q axis current generation manager 109 in greater detail than FIG. 1. In one configuration, the 3-D (three dimensional) magnetic torque component weighting look-up table 304 receives a torque command 316 (e.g., expressed in percentage) and adjusted voltage-overspeed-ratio 318 as inputs. The 3-D (three dimensional) magnetic torque component weighting look-up table 304 provides an interpolated weighting of the magnetic torque component (e.g., $W^C{}_{mag}$) as an output. The 3-D (three dimensional) magnetic torque look-up table 304 defines a first relationship between a respective combination of the inputted torque command data 316, the inputted adjusted voltage-over-speed ratio data 318 and a corresponding outputted interpolated weighting of the magnetic torque component (e.g., $W^C{}_{mag}$).

The torque command data 316 and the adjusted voltage-over-speed ratio data 318 is inputted to a 3-D quadrature-axis current ($I_q$) look-up table 302, a 3-D direct-axis current ($I_d$) look-up table 308, and a 3-D actual flux linkage look-up table 306. The 3-D quadrature-axis current ($I_q$) look up table 302 defines a second relationship between a respective combination of the inputted torque command 316, the inputted adjusted voltage over-speed-ratio 318 and a corresponding outputted, interpolated quadrature-axis current command (e.g., $i^*{}_q$). The 3-D quadrature-axis current ($I_d$) look-up table 308 defines a third relationship between a respective combination of the inputted torque command 316, the inputted adjusted voltage-over-speed ratio 318 and a corresponding outputted, interpolated direct-axis current command (e.g., $r_d$). The 3-d actual flux linkage look up table defines a fourth relationship between a respective combination of the inputted torque command 316, the inputted adjusted voltage-over-speed ratio 318 and a corresponding outputted interpolated actual flux linkage level (e.g., $V_q^{*C}/\omega_e^C$ or where $V_q^{*C}$ is an average).

The interpolated actual flux linkage level is inputted to the estimator 314 for magnetic temperature deviation from characterization. The estimator 314 also inputs stored values of magnetic flux strength (e.g., $V_q^{*O}$ or its average) at ambient temperature and corresponding rotational electrical speed (e.g., $\omega_e^C$) at ambient temperature or at a known reference temperature for the rotor. The stored values of magnetic flux strength and corresponding rotational speed are stored in data storage device 260 or register of nonvolatile memory, for example. The estimator 314 outputs a change in magnet temperature (e.g., $\Delta T_{magnet}$). The calculator 312 for calculating a q-axis current command adjustment coefficient calculates a q-axis current adjustment based on the received change in magnet temperature and the interpolated weighting of the magnetic torque component. At a multiplier 319 or an auxiliary summer 119, the interpolated quadrature-axis (q-axis) current command adjustment coefficient (e.g., $J_q$) is multiplied or otherwise combined with the interpolated quadrature axis command (e.g., interpolated $i_q$ command or $i_q^*$) to yield an adjusted quadrature-axis current command (e.g., $i^*_{q\_adjusted}$).

The d-q axis current generation manager 109 stores characterizations of the operating torque curves versus operating rotor speed over a range of operating speeds. The moving average of the q-axis voltage command is recorded in the data storage device 260 during a characterization of the motor 117 or defining of the motor 117 operating points or operational output torque versus speed curve. The motor 117 (e.g., IPMSM) needs to be carefully characterized such that best operating trajectories can be determined at different operating speeds. During the characterization, best control angles are selected for a batch of current magnitudes at a specific motor speed of the motor shaft. In addition to recording output torque at each operating point, quadrature axis (q-axis) terminal voltage command calculated from the controller 111 should be recorded as well.

In the data processing system 120 or current regulation controller 111, the $v_q$ command is updated in every pulse width modulation (PWM) cycle or at another update interval, as follows:

$$v^*_q = G_{cq}(s) \cdot (i^*_q - i_q) + \omega_e \cdot L_d \cdot i^*_d + \omega_e \cdot \lambda_f^R, \quad (4)$$

where the first expression (of $G_{cq}(s)^*(i^*_q - i_q)$) is current regulation proportional integral (PI) output and the remaining expression (of $\omega_e^* L_d^* i^*_d + \omega_e^* \lambda_f^R$) relates to feed forward items, which reflect the cross-coupling of dq-axis and back electromotive force (EMF) effect. Because $\lambda_f^R$ is the reference flux linkage level at ambient (e.g., room) temperature, the integration item of $i_q$ proportional integral (PI) regulator will be adjusted to the proper value such that the actual flux linkage level can be compensated for.

Due to the proportional integral (PI) regulation action, the generated quadrature axis voltage ($v^*_q$) actually fluctuates slightly around an average value even in steady state condition. In order to accurately reflect the true level of maximum flux linkage per phase ($\lambda_f$) during characterization, a moving average of $v^*_q$, $\tilde{v}^*_q$, the average quadrature axis voltage command, shall be recorded corresponding to each operating point during characterization.

Finally, at a specific operating point, its true flux linkage level during characterization can be calculated as follows:

$$\lambda_f^C = \lambda_f^R + \frac{\tilde{v}_q^{*C}}{\omega_e^C}, \quad (5)$$

where $\lambda_f^C$ is the calculated true flux linkage level per phase during characterization (e.g., under various known operational conditions and corresponding temperatures), $\lambda_f^R$ is the flux linkage level per phase at a reference operating condition and at a corresponding reference ambient temperature, $\tilde{v}_q^{*C}$ is the recorded quadrature-axis terminal voltage command moving average during characterization, and we is the rotational electrical speed of the rotor during characterization. In one configuration, $\lambda_f^C$ or $\lambda_f^R$ may also include some compensation for inaccurate direct axis inductance (e.g., $L_d$ parameter) in the feed forward item (e.g., $\Delta L_d \cdot i^*_d$). At the end of the characterization of a particular motor 117, three 3-D lookup tables shall be constructed, as illustrated in block 302, block 304, and block 306 of FIG. 3, for example.

The rotor magnet temperature estimation module 104 estimates the runtime magnet temperature deviation from a characterization level (e.g., reference operational conditions). While the motor 117 (e.g., IPMSM) is running, the adjusted voltage-over-speed ratio 318 and torque command percentage 316 will determine the ($i^*_d, i^*_q$) commands from 3-D lookup tables. Then the q-axis terminal voltage command moving average value can be continuously calculated during the runtime operation. Therefore, the actual flux linkage level during runtime operation can be calculated as follows:

$$\lambda_f^O = \lambda_f^R + \frac{\tilde{v}_q^{*O}}{\omega_e^O} \quad (6)$$

where $\tilde{v}_q^{*O}$ is the runtime calculated q-axis terminal voltage command moving average value, $\omega_e^O$ is the actual motor rotational electrical speed. Because of the DC bus voltage variation, the same set of ($i^*_d, i^*_q$) commands could be running at a different motor speed than the corresponding characterization speed, unless compensation for the DC bus voltage variation is provided by the calculation module 110 or otherwise by the data processing system 120.

Based on Equation (5) and Equation (6), the flux linkage deviation at runtime away from characterization stage for the same set of d-q axis current commands ($i^*_d, i^*_q$) can be calculated as follows:

$$\Delta \lambda_f = \lambda_f^O - \lambda_f^C = \frac{\tilde{v}_q^O}{\omega_e^O} - \frac{\tilde{v}_q^{*C}}{\omega_e^C} \quad (7)$$

Similar to $\lambda_f^C$, $\lambda_f^O$ may also include some compensation for inaccurate $L_d$. However, ($\lambda_f^O - \lambda_f^C$) should remove the dependence on $L_d$ compensation. The corresponding rotor magnet temperature change, $\Delta T_{magnet}$, can be calculated as follows:

$$\Delta T_{magnet} = \frac{\Delta \lambda_f}{\lambda_f^R \cdot \xi}, \quad (8)$$

where $\xi$ is a negative temperature coefficient for permanent magnet material, $\Delta \lambda_f$ is the change in magnet flux per phase, $\lambda_f^R$ is the magnetic flux per phase at a reference temperature (e.g., ambient temperature) or at reference operating conditions. A positive value of $\Delta T_{magnet}$ means increased magnet temperature, while a negative value of $\Delta T_{magnet}$ means decreased magnet temperature.

In FIG. 3, the magnetic torque component weighting is calculated for producing the 3-D magnetic torque component weighting look-up table, for example. IPMSM characterization procedure determines best operating trajectory over the full speed range. For a specific set of ($i^*_d, i^*_q$) command, corresponding magnetic torque component and reluctance torque component can be calculated using given machine parameters. Therefore, the nominal weighting percentage of magnetic torque component out of the total output torque can be calculated as follows:

$$W_{mag}^C = \frac{\frac{3}{2} pp \cdot \lambda_f^R \cdot i_q^*}{\frac{3}{2} pp \cdot \lambda_f^R \cdot i_q^* + \frac{3}{2} pp \cdot (L_d - L_q) \cdot i_d^* \cdot i_q^*}, \quad (9)$$

where $W_{mag}^C$ is the weighting of the magnetic torque component, pp is the number of pole pairs of the motor or machine, $\lambda_f^R$ is the maximum flux linkage per phase at reference temperature or operating condition, $i_d^*$ is the direct axis current command, $i_q^*$ is the quadrature axis current command, $L_d$ is the direct axis inductance, and $L_q$ is the quadrature axis inductance.

The calculated magnetic torque component weighing is obtained using nominal machine parameters (e.g., pole pairs and inductances) and will be slightly different from the true magnetic torque weighting during the characterization stage. The difference in the torque weighting could potentially cause some inaccuracy in the torque compensation stage, such that the data processing system 120 may apply additional compensation to the torque weighing based on supplemental or empirical tests. After this offline post-characterization calculation, we can generate the fourth 3-D lookup table as illustrated in block 304 of FIG. 3.

Figure 4:
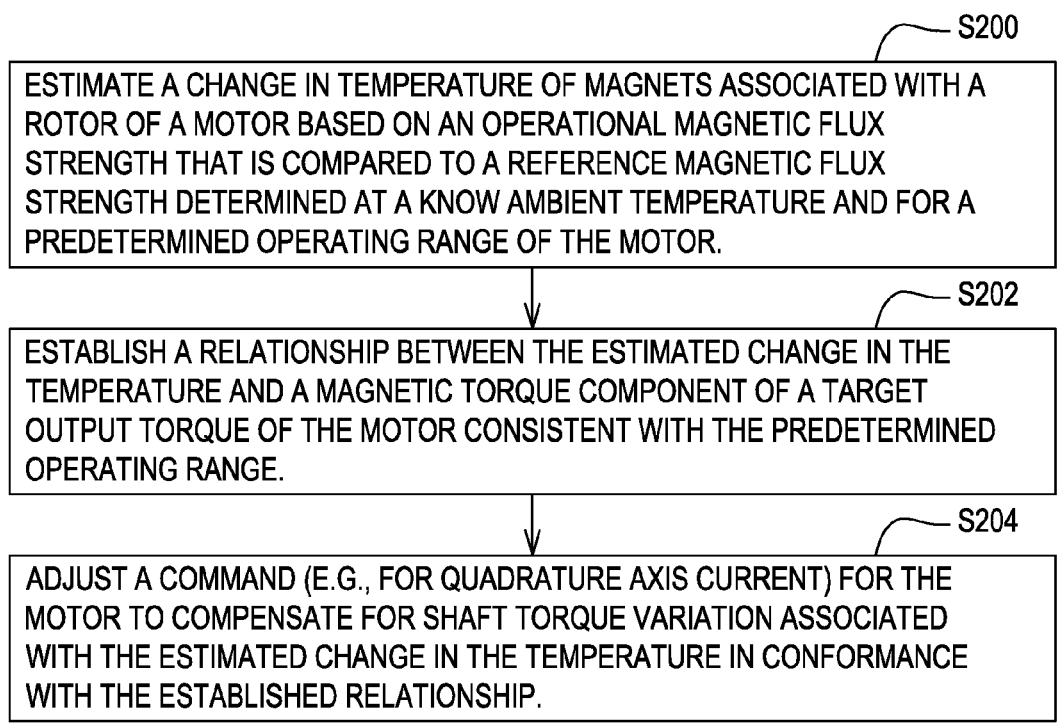
FIG. 4 is a flow chart of a first embodiment of a method for controlling an electrical motor with temperature compensation.

FIG. 4 discloses a method for controlling an electrical motor 117 (e.g., an interior permanent magnet motor, induction motor or other alternating current machine) with temperature compensation. The method of FIG. 4 begins in step S200.

In step S200, a rotor magnet temperature estimation module 104 or an electronic data processing system 120 estimates a change in temperature of one or more magnets associated with a rotor of a motor 117. For example, the rotor magnet temperature estimation module 104 or an electronic data processing system 120 estimates a change in temperature of one or more magnets based on an operational magnetic flux strength that is compared to a reference magnetic flux strength determined at a known ambient temperature (e.g., room temperature) for a predetermined operating range (e.g., revolutions per minute and torque load) of the motor 117. Ambient temperature could be set to any suitable reference temperature within the operational temperature range, but is preferable set at or near room temperature or at the middle of the operational temperature range (e.g., negative 40 degrees Celsius to 150 degrees Celsius).

The rotor magnetic strength of permanent has a significant negative temperature coefficient, around 0.09% to around 0.12% per degree Celsius (C), with respect to the magnet temperature change. In practice, the magnet temperature can easily vary from negative 40 degrees Celsius at cold start up to 150 degrees Celsius at high speed full torque operation, particularly where the motor 117 is used in a vehicle in outdoor weather. Magnet strength could vary up to approximately twenty (20) percent and cause corresponding output torque change on the motor shaft 126 in the absence of the torque compensation provided in accordance with the methods of FIG. 4 through FIG. 6, inclusive.

In one embodiment, the operational magnetic flux strength is derived from an operational quadrature-axis voltage command and the reference magnetic flux strength is derived from a reference quadrature-axis voltage command. The operating range (e.g., predetermined operating range) of the motor 117 may be determined by or expressed as a function of one or more of the following factors: the machine operating speed (e.g., rotational motor shaft 126 speed), the torque load on the motor 117 (e.g., as indicated by current magnitude or current draw), the motor 117 operating duration (e.g., continuous versus intermittent operation), and the coolant flow rate and temperature (if applicable).

In an alternate embodiment, the data processing system 120 determines whether the motor 117 is operating at a motor shaft speed below a lower threshold. If the motor 117 is operating at a motor shaft speed below the lower threshold, the data processing system 120 may supplement the determination of rotor magnet temperature with a stator winding temperature sensor 115, a coolant temperature sensor 115, both.

In step S202, the rotor magnet temperature estimation module 104, or the d-q axis current adjustment module 107, or the data processing system 120 establishes a relationship between the estimated change in the temperature and a magnetic torque component of a target output torque of the motor 117 consistent with the predetermined operating range. In accordance with a first example for executing step S202, the establishing of the relationship comprises determining the magnetic torque component of the target output torque as a function of the reference magnetic flux strength, a direct-axis current command, a quadrature-axis current command, direct-axis inductance and quadrature-axis inductance. In accordance with a second example for executing step S202, the relationship is determined in accordance with the following equation:

$$J_q = \frac{1}{W_{mag}^C \cdot (1 + \Delta T_{magnet} \cdot \xi) + (1 - W_{mag}^C)} = \frac{1}{W_{mag}^C \cdot \left(1 + \frac{\Delta \lambda_f}{\lambda_f^R}\right) + (1 + W_{mag}^C)},$$

where $J_q$ is the adjustment coefficient for q-axis current command, $W_{mag}^C$ is magnetic torque weighting, $\Delta T_{magnet}$ is calculated magnet temperature change, $\xi$ is a negative temperature coefficient for permanent magnet material of the rotor magnets, $\Delta \lambda_f$ is the change in magnet flux per phase, $\lambda_f^R$ is the magnetic flux per phase at a reference temperature (e.g., ambient temperature) or at reference operating conditions. The above equation may assume the inductance difference between direct-axis inductance and quadrature-axis inductance ($L_d$-$L_q$) has negligible change with slight variation in d-q axis current commands ($i_d$, $i_q$).

In step S204, the d-q axis current adjustment module 107, or the d-q axis current generation manager 109, or the summer 119, or the data processing system 120 adjusts a command (e.g., for the quadrature axis current) for the motor 117 to compensate for shaft 126 torque variation associated with the estimated change in the temperature in conformance with the established relationship. Step S204 may be carried out in accordance with various techniques that may be applied alternately or cumulatively. In accordance with a first technique, the adjusting of the command further comprises adjusting a quadrature-axis current command. In accordance with a second technique, the command is determine in accordance with the following equations:

$$i^*_{q\_adjusted} = i^*_q \cdot J_q \text{ and}$$

$$J_q = \frac{1}{W^C_{mag} \cdot (1 + \Delta T_{magnet} \cdot \xi) + (1 - W^C_{mag})}$$

$$= \frac{1}{W^C_{mag} \cdot \left(1 + \frac{\Delta \lambda_f}{\lambda^R_f}\right) + (1 W^C_{mag})},$$

where $i^*_{q\_adjusted}$ is the product of the quadratic axis current command and the $J_q$ adjustment coefficient, $J_q$ is the adjustment coefficient for the q-axis current command, $\Delta T_{magnet}$ is calculated magnet temperature change, $\xi$ is a negative temperature coefficient for permanent magnet material of the rotor magnets, $W^C_{mag}$ is magnetic torque weighting, $\Delta \lambda_f$ is the change in magnet flux per phase, $\lambda^R_f$ is the magnetic flux per phase at a reference temperature (e.g., ambient temperature) or at reference operating conditions.

The above equation assumes the inductance difference ($L_d$-$L_q$) has negligible change with slight variation in ($i_d$,$i_q$) commands. In one embodiment, the adjustment coefficient ($J_q$) facilitates the maintenance of an output torque that is within approximately five percent (5%) of the torque command throughout the whole operating range of the motor 117. Without the above proper adjustments of controller current commands of the data processing system 120, if the magnet strength becomes weaker from an increase in magnet temperature, the output torque and operating efficiency of the motor 117 would drop. Similarly, when the magnet strength becomes stronger from a decrease in magnet temperature, the output torque of the motor 117 would increase to overuse terminal voltage or tend to cause instability in current regulation (e.g., of the current regulation controller 111).

Figure 5:
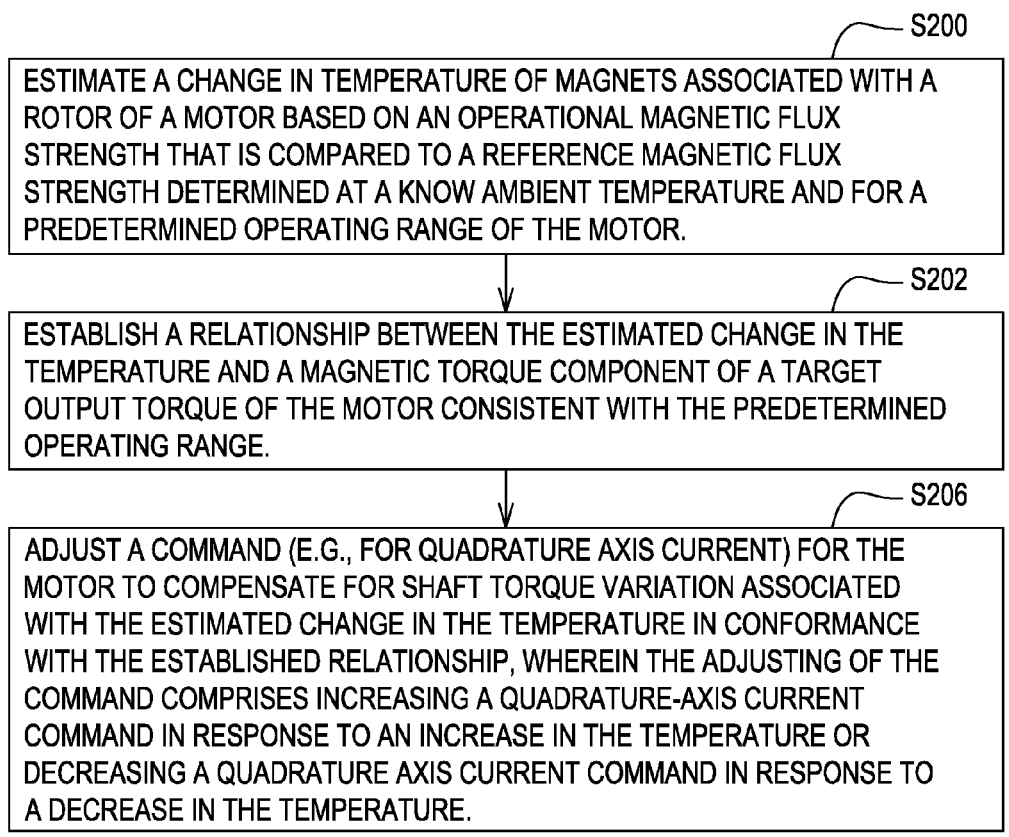
FIG. 5 is a flow chart of a second embodiment of a method for controlling an electrical motor with temperature compensation.

The method of FIG. 5 is similar to the method of FIG. 4, except the method of FIG. 5 replaces step S204 with step S206. Like reference numbers in FIG. 4 and FIG. 5 indicate like procedures or steps.

In step S206, the d-q axis current adjustment module 107, or the d-q axis current generation manager 109, or the summer 119, the multiplier 310, or the data processing system 120 adjusts a command (e.g., for the quadrature axis current) for the motor 117 to compensate for shaft 126 torque variation associated with the estimated change in the temperature in conformance with the established relationship, wherein the adjusting of the command comprises increasing a quadrature-axis current command in response to an increase in temperature of the magnets of the rotor of the motor 117.

Figure 6:
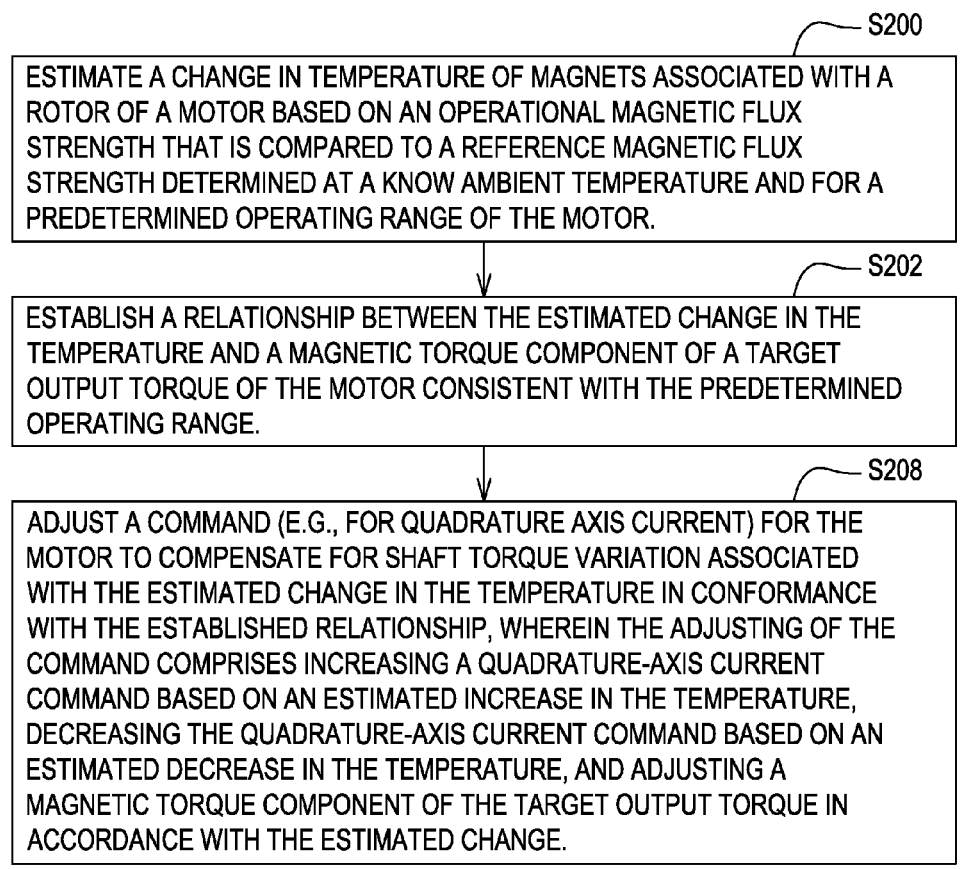
FIG. 6 is a flow chart of a third embodiment for controlling an electrical motor with temperature compensation.

The method of FIG. 6 is similar to the method of FIG. 4, except the method of FIG. 6 replaces step S204 with step S208. Like reference numbers in FIG. 4 and FIG. 5 indicate like procedures or steps.

In step S208, the d-q axis current adjustment module 107, or the d-q axis current generation manager 109, or the summer 119, or the data processing system 120 adjusts a command (e.g., for the quadrature axis current) for the motor 117 to compensate for shaft 126 torque variation associated with the estimated change in the temperature in conformance with the established relationship, wherein the adjusting of the command comprises adjusting a quadrature-axis current command based on the estimated change in the temperature and a magnetic torque component of the target output command. Step S208 may be executed in accordance with various procedures that may be applied alternately or cumulatively. Under a first procedure, the estimated change in the temperature is determined in accordance with the following equation:

$$\Delta T_{magnet} = \frac{\Delta \lambda_f}{\lambda^R_f \cdot \xi},$$

where $\Delta T_{magnet}$ is the change in magnet temperature, with positive values of $\Delta T_{magnet}$ indicate an increase in temperature and negative values of $\Delta T_{magnet}$ indicate a decrease in temperature, $\Delta \lambda_f$ is the change in magnet flux per phase, $\lambda^R_f$ is the magnetic flux per phase at a reference temperature (e.g., ambient temperature) or at reference operating conditions, and $\xi$ is a negative temperature coefficient for permanent magnet material.

Under a second procedure, the magnetic torque component is determined in accordance with the following equation:

$$W^C_{mag} = \frac{\frac{3}{2} pp \cdot \lambda^R_f \cdot i^*_q}{\frac{3}{2} pp \cdot \lambda^R_f \cdot i^*_q + \frac{3}{2} pp \cdot (L_d - L_q) \cdot i^*_d \cdot i^*_q},$$

where $W^C_{mag}$ is nominal weighting percentage of the magnetic torque component of the total output torque, pp are the number of pole pairs of the motor, $\lambda^R_f$ is the maximum flux linkage per phase at reference temperature or operating condition, $i_d^*$ is the respective direct axis current command, $i_q^*$ is the corresponding quadrature axis current command, $L_d$ is the direct axis inductance, and $L_q$ is the quadrature axis inductance. In the above equation, is a specific set or corresponding pair of d-q axis current commands (e.g., for a pulse cycle of the PWM signal).

The method and system disclosed herein is well suited for achieving uniform torque of the motor 117 within a suitable tolerance (e.g., plus or minus five percent) of a target torque, regardless of variation in the temperature of the rotor magnets. For example, the temperature of the rotor magnets may vary because of a change in ambient temperature from weather conditions or because of the duty-cycle (e.g., continuous versus intermittent) of a vehicle or machine on which the motor operates. Further, the method and system disclosed herein is well-suited for improving machine operating efficiency under sundry magnet strength conditions.

Having described the preferred embodiment, it will become apparent that various modifications can be made without departing from the scope of the invention as defined in the accompanying claims.

The following is claimed:

1. A method for controlling an electrical motor comprising a rotor with associated magnets and a stator, the method comprising:

estimating a change in temperature of the magnets associated with the rotor of the motor based on an operational magnetic flux strength that is compared to a reference magnetic flux strength determined at a known ambient temperature and for a predetermined operating range of the motor;

establishing a relationship between the estimated change in the temperature and a magnetic torque component of a target output torque of the motor consistent with the predetermined operating range; and adjusting a command for the motor to compensate for shaft torque variation associated with the estimated change in the temperature in conformance with the established relationship.

2. The method according to claim 1 wherein the operational magnetic flux strength is derived from an operational quadrature-axis voltage command and wherein the reference magnetic flex strength is derived from a reference quadrature-axis voltage command.

3. The method according to claim 1 wherein the establishing of the relationship comprises determining the magnetic torque component of the target output torque as a function of the reference magnetic flux strength, a direct-axis current command, a quadrature-axis current command, direct-axis inductance and quadrature-axis inductance.

4. The method according to claim 1 wherein the adjusting of the command further comprises adjusting a quadrature-axis current command.

5. The method according to claim 1 wherein the adjusting of the command further comprises increasing a quadrature-axis current command in response to an increase in the temperature.

6. The method according to claim 1 wherein the adjusting of the command further comprises adjusting a quadrature-axis current command based on the estimated change in the temperature and a magnetic torque component of the target output torque.

7. The method according to claim 6 wherein the change in the estimated change in the temperature is determined in accordance with the following equation:

$$\Delta T_{magnet} = \frac{\Delta \lambda_f}{\lambda_f^R \cdot \xi}$$

where $\Delta T_{magnet}$ is the change in magnet temperature or the magnets, with positive values of $\Delta T_{magnet}$ indicate an increase in temperature and negative values of $\Delta T_{magnet}$ indicate a decrease in temperature, $\xi$ is a negative temperature coefficient for the magnets of the rotor, $\Delta \lambda_f$ is the change in magnet flux per phase, $\lambda_f^R$ is the magnetic flux per phase at the known ambient temperature and for a predetermined operating range of the motor.

8. The method according to claim 6 wherein the magnetic torque component is determined in accordance with the following equation:

$$W_{mag}^C = \frac{\frac{3}{2} pp \cdot \lambda_f^R \cdot i_q^*}{\frac{3}{2} pp \cdot \lambda_f^R \cdot i_q^* + \frac{3}{2} pp \cdot (L_d - L_q) \cdot i_d^* \cdot i_q^*},$$

where $W^C_{mag}$ is a weighting of the magnetic torque component, pp is the number of pole pairs of the motor, $\lambda_f^R$ is a maximum flux linkage per phase at the known i ambient temperature under the predetermined operating range, $i_d^*$ is a respective direct axis current command, $i_q^*$ is a corresponding quadrature axis current command, $L_d$ is the direct axis inductance, and $L_q$ is the quadrature axis inductance.

9. The method according to claim 1 wherein the relationship is determined in accordance with the following equation:

$$J_q = \frac{1}{W_{mag}^C \cdot (1 + \Delta T_{magnet} \cdot \xi) + (1 - W_{mag}^C)}$$

$$= \frac{1}{W_{mag}^C \cdot \left(1 + \frac{\Delta \lambda_f}{\lambda_f^R}\right) + (1 - W_{mag}^C)},$$

where $J_q$ is an adjustment coefficient for q-axis current command, $W_{mag}^C$ is a magnetic torque weighting, $\Delta T_{magnet}$ is calculated magnet temperature change, $\xi$ is a negative temperature coefficient for permanent magnet material of the magnets, $\Delta \lambda_f$ is the change in magnet flux per phase, $\lambda_f^R$ is the magnetic flux per phase at the known ambient temperature under the predetermined operating range.

10. The method according to claim 1 wherein the command is determined in accordance with the following equations:

$$i_{q\_adjusted}^* = i_q^* \cdot J_q \text{ and}$$

$$J_q = \frac{1}{W_{mag}^C \cdot (1 + \Delta T_{magnet} \cdot \xi) + (1 - W_{mag}^C)}$$

$$= \frac{1}{W_{mag}^C \cdot \left(1 + \frac{\Delta \lambda_f}{\lambda_f^R}\right) + (1 - W_{mag}^C)},$$

where $i^*_{q\_adjusted}$ is a product of the quadratic axis current command and the $J_q$ adjustment coefficient, $J_g$ is the adjustment coefficient for the q-axis current command, $\Delta T_{magnet}$ is calculated magnet temperature change, $\xi$ is a negative temperature coefficient for permanent magnet material of the magnets, $W_{mag}^C$, is magnetic torque weighting, $\Delta \lambda_f$ is a change in magnet flux per phase, $\lambda_f^R$ is the magnetic flux per phase at the known ambient temperature under the predetermined operating range.

11. A system for controlling an electrical motor, where the motor comprises a rotor with associated magnets and a stator, the system comprising:

a data processor for estimating a change in temperature of the magnets associated with the rotor of the motor based on an operational magnetic flux strength that is compared to a reference magnetic flux strength determined at a known ambient temperature and for a predetermined operating range of the motor;

a temperature estimation module for establishing a relationship between the estimated change in the temperature and a magnetic torque component of a target output torque of the motor consistent with the predetermined operating range; and a current adjustment module for adjusting a command for the motor to compensate for shaft torque variation associated with the estimated change in the temperature in conformance with the established relationship.

12. The system according to claim 11 wherein the data processor is arranged to derive the operational magnetic flux strength from an operational quadrature-axis voltage command and wherein the data processor is arranged to derive the reference magnetic flex strength from a reference quadrature-axis voltage command.

13. The system according to claim 11 wherein the data processor is adapted to execute software instructions of the temperature estimation module to establish the relationship, where the relationship comprises the magnetic torque component of the target output torque as a function of the reference magnetic flux strength, a direct-axis current command, a quadrature-axis current command, direct-axis inductance and quadrature-axis inductance.

14. The system according to claim 11 wherein the command comprises a quadrature-axis current command.

15. The system according to claim 11 wherein the command comprises a respective increase in a quadrature-axis current command in response to a corresponding increase in the temperature.

16. The system according to claim 11 wherein the command comprises an adjustment to a quadrature-axis current command based on the estimated change in the temperature and a magnetic torque component of the target output torque.

17. The system according to claim 16 wherein the change in the estimated change in the temperature is determined by the data processor in accordance with the following equation:

$$\Delta T_{magnet} = \frac{\Delta \lambda_f}{\lambda_f^R \cdot \xi}$$

where $\Delta T_{magnet}$ is the change in magnet temperature or the magnets, with positive values of $\Delta T_{magnet}$ indicate an increase in temperature and negative values of $\Delta T_{magnet}$ indicate a decrease in temperature, $\xi$ is a negative temperature coefficient for the magnets of the rotor, $\Delta \lambda_f$ is the change in magnet flux per phase, $\lambda_f^R$ is the magnetic flux per phase at the known ambient temperature and for a predetermined operating range of the motor.

18. The system according to claim 16 wherein the magnetic torque component is determined by the data processor in accordance with the following equation:

$$W_{mag}^C = \frac{\frac{3}{2} pp \cdot \lambda_f^R \cdot i_q^*}{\frac{3}{2} pp \cdot \lambda_f^R \cdot i_q^* + \frac{3}{2} pp \cdot (L_d - L_q) \cdot i_d^* \cdot i_q^*},$$

where $W^C_{mag}$ is a weighting of the magnetic torque component, pp is the number of pole pairs of the motor, $\lambda_f^R$ is a maximum flux linkage per phase at the known i ambient temperature under the predetermined operating range, $i_d^*$ is a respective direct axis current command, $i_q^*$ is a corresponding quadrature axis current command, $L_d$ is the direct axis inductance, and $L_q$ is the quadrature axis inductance.

19. The system according to claim 11 wherein the relationship is determined by the data processor in accordance with the following equation:

$$J_q = \frac{1}{W_{mag}^C \cdot (1 + \Delta T_{magnet} \cdot \xi) + (1 - W_{mag}^C)}$$

$$= \frac{1}{W_{mag}^C \cdot \left(1 + \frac{\Delta \lambda_f}{\lambda_f^R}\right) + (1 - W_{mag}^C)},$$

where $J_q$ is an adjustment coefficient for q-axis current command, $W_{mag}^C$ is a magnetic torque weighting, $\Delta T_{magnet}$ is calculated magnet temperature change, $\xi$ is a negative temperature coefficient for permanent magnet material of the magnets, $\Delta \lambda_f$ is the change in magnet flux per phase, $\lambda_f^R$ is the magnetic flux per phase at the known ambient temperature under the predetermined operating range.

20. The system according to claim 11 wherein the command is determined by the data processor in accordance with the following equations:

$$i_{q\_adjusted}^* = i_q^* \cdot J_q \text{ and}$$

$$J_q = \frac{1}{W_{mag}^C \cdot (1 + \Delta T_{magnet} \cdot \xi) + (1 - W_{mag}^C)}$$

$$= \frac{1}{W_{mag}^C \cdot \left(1 + \frac{\Delta \lambda_f}{\lambda_f^R}\right) + (1 - W_{mag}^C)},$$

where $i^*_{q\_adjusted}$ is a product of the quadratic axis current command and the $J_q$ adjustment coefficient, $J_g$ is the adjustment coefficient for the q-axis current command, $\Delta T_{magnet}$ is calculated magnet temperature change, $\xi$ is a negative temperature coefficient for permanent magnet material of the magnets, $W_{mag}^C$, is magnetic torque weighting, $\Delta \lambda_f$ is a change in magnet flux per phase, $\lambda_f^R$ is the magnetic flux per phase at the known ambient temperature under the predetermined operating range.

* * * * *